US007206414B2

(12) United States Patent
Schulz

(10) Patent No.: US 7,206,414 B2
(45) Date of Patent: Apr. 17, 2007

(54) METHOD AND DEVICE FOR SELECTING A SOUND ALGORITHM

(75) Inventor: Donald Schulz, Sulzbach (DE)

(73) Assignee: Grundig Multimedia B.V., Amsterdam (NL)

( * ) Notice: Subject to any disclaimer, the term of this patent is extended or adjusted under 35 U.S.C. 154(b) by 237 days.

(21) Appl. No.: 10/491,269

(22) PCT Filed: Sep. 30, 2002

(86) PCT No.: PCT/EP02/10961

§ 371 (c)(1),
(2), (4) Date: Feb. 15, 2005

(87) PCT Pub. No.: WO03/030588

PCT Pub. Date: Apr. 10, 2003

(65) Prior Publication Data

US 2005/0129251 A1 Jun. 16, 2005

(30) Foreign Application Priority Data

Sep. 29, 2001 (DE) ................................ 101 48 351

(51) Int. Cl.
*G05B 19/18* (2006.01)

(52) U.S. Cl. ......................................... 381/56; 704/232

(58) Field of Classification Search .................. 381/56, 381/1, 58, 10–11, 123; 352/27, 37; 704/200, 704/230, 323–233; 84/1, 645, 600–603, 84/615–616, 653–654; 700/94
See application file for complete search history.

(56) References Cited

U.S. PATENT DOCUMENTS 5,375,188 A * 12/1994 Serikawa et al. ........... 704/215
5,450,312 A * 9/1995 Lee et al. ...................... 700/1
5,617,478 A 4/1997 Tagami et al.
5,712,953 A 1/1998 Langs
6,167,372 A * 12/2000 Maeda ....................... 704/207
6,195,438 B1 * 2/2001 Yumoto et al. ............. 381/103
6,570,991 B1 * 5/2003 Scheirer et al. ............. 381/110
6,819,863 B2 * 11/2004 Dagtas et al. ................. 386/46

FOREIGN PATENT DOCUMENTS

DE 198 48 491 A1 4/2000
EP 0 517 233 A1 12/1992

OTHER PUBLICATIONS

Zhang T et al: "Audio content analysis for online and audiovisual data segmentation and classification", IEEE Transactions On Speech and Audio Processing, May 2001, IEEE, USA, Bd. 9. Nr. 4, Seiten 441-457, XP001164214, ISSN: 1063-6676 Zusammenfassung.

International Search Report, PCT/EP02/10961 dated Aug. 28, 2003.

* cited by examiner

*Primary Examiner*—Vivian Chin
*Assistant Examiner*—Lun-See Lao
(74) *Attorney, Agent, or Firm*—Quarles & Brady LLP

(57) ABSTRACT

The invention relates to a method for selecting a sound algorithm for processing an audio signal. The audio signal is analyzed and the type of audio signal is ascertained based on the analysis. The audio signal is classified as a music signal or another signal, and different sound algorithms are used for the further processing and subsequent output of the audio signal.

24 Claims, 1 Drawing Sheet

METHOD AND DEVICE FOR SELECTING A SOUND ALGORITHM

BACKGROUND OF THE INVENTION

The invention concerns a method and a device for the selection of a sound algorithm for the processing of audio signals.

Modem high-fi equipment is provided with various sound programs which permit distribution of stereophonic audio signals to more than only two loudspeakers or to produce surround sound in some other way. Thus, for example, after decoding of the audio signals, these are split into five individual audio channels and are used through the so-called "virtualizer" for reproduction via only two loudspeakers. Special "virtualizers" are also known which convert audio signals for reproduction specifically through earphones.

One of the best known methods for this is the so-called "Dolby Pro Logic" method which, in the case of film material, is essentially used to be able to influence the localization of the sound. Thus, speakers are usually imaged on the center channel and the noises can be come exclusively from the back loudspeakers.

Furthermore, there is a whole class of methods which are used for simulation of acoustics. Frequently, applicable names of such methods are "echo", "stadium", "jazz", "club", etc. In this method, optimized for music signals, it is not desirable to take speech signals (singing) only from the center loudspeaker, or to emit a music signal only from the back loudspeakers which is possible when using the "Dolby Pro Logic" method.

In the successor of Dolby Pro Logic, which is called Dolby Pro Logic II, apart from the film mode, a mode for music is provided, which takes these differences into consideration.

A method is known for coding of speech from EP 0 481 374 B1. Here, a discrete transformation of a speech window is performed in order to obtain a discrete spectrum of coefficients. An approximate envelope of the discrete spectrum will be calculated in each of a large number of sub-bands and used for the digital coding of the defined envelope of each sub-band. Within sub-bands, each scaled coefficient is recalculated into a number of bits, with at least one of a multiple number of quantizers of different bit lengths. The quantizer used for each sub-band is determined for each speech window by calculation of the assignment of bits as a number of bits greater than or equal to zero, as a function of a power density evaluation for the sub-band and a distortion error evaluation for the speech window.

From EP 0 587 733 B1, a signal analysis system is known for filtering of an input sample value representing one or several signals. Input buffer means are provided for grouping the input samples into time-range/signal sample blocks. The input sample values are analysis-window-weighted samples. In addition, analysis means are present for producing spectral information as response to the time-range/signal sample value blocks, where the spectral information contains spectral coefficients, which used essentially in an even-numbered stack of time-range/aliasing-removal transformation, corresponds to time-range signal sample value blocks. The spectral coefficients are essentially coefficients of a modified discrete cosine transformation or coefficients or coefficients of a modified discrete sine transformation. The analysis means include forward pre-transformation means to produce modified sample value blocks and forward pre-transformation means to produce frequency range transformation coefficients.

From EP 0 664 943 B1, a coding device is known for adaptive processing of audio signals for coding, transfer, or storage and recovery, where the noise level fluctuates with the signal amplitude level. A processing device is present which responds to input signals in such a way that it emits either a first and second signal or the sum and difference of the first and second signals. The first and second signals correspond to the two matrix-coded audio signals of a four by two audio signal matrix, where the processing device also produces a control signal, which shows if the first and second signal or the sum and difference of the first and second signal is emitted.

A decoder is known from EP 0 519 055 B1, consisting of a receiving means for receiving a multiplicity of information formatted by delivery channels, deformation means for producing, in response to the receiving means, a deformatted representation depending on each delivery channel, and synthesis means for producing output signals depending on the deformatted representations. A divider means is arranged between the deformatting means and the synthesis means, which respond to the deformatting means and produce one or several intermediate signals, where at least one intermediate signal is produced by combination of the information from two or more deformatted representations. The synthesis means produce a particular output signal as response to each of the intermediate signals.

From EP 0 520 068 B1, a coder is known for coding two or more audio channels. The coder has a sub-band device for producing sub-band signals, a mixing device for creating one or several composed signals, and means for producing control information for a correspondingly composed signal. In addition, the coder has a coding device for producing coded information by allocating bits to one or several composed signals. Furthermore, a formatting device is present for combining the coded information and the control information into an output signal.

A speech coder is known from EP 0 208 712 B1. This speech coder contains a Fourier transform device for performing a discrete Fourier transformation of an incoming speech signal to produce a discrete transformation spectrum of coefficients, a standardization device for modifying the transformation spectrum to produce a scaled, flatter spectrum and to code a function through which the discrete spectrum is modified. In addition, a device is present for coding at least a part of the spectrum. The standardization device has a device (44) for defining the approximated envelope of the discrete spectrum in each of several sub-bands of coefficients and for coding the defined envelope of each sub-band of coefficients, as well as devices for scaling each spectrum coefficient relative to the defined envelope of the respective sub-band of coefficients.

However, in each of the known inventions it is a disadvantage that the selection of a sound algorithm must be adjusted manually. For example, if a television tone of an actually chosen television channel is processed through a Dolby Pro Logic II decoder and the television channel is switched several times between music stations and films or news, then upon each change one must manually switch between the individual audio sound algorithms which process the audio data, for example, between music mode and film mode.

SUMMARY OF THE INVENTION

The task of the invention is to provide a method and a device which assigns a sound algorithm automatically to an audio signal. The present invention accomplishes this task.

Advantageous embodiments and further developments of the invention are given in the dependent claims, in the corresponding specification and in the figures.

The present invention solves the task by the fact that the nature of the audio signal is recognized, and, based on the recognition of the nature of the audio signal, an automatic setting of the sound algorithm will be assigned.

In order to recognize the nature of the audio signal, different quantities are defined and evaluated.

As the first quantity, it is determined which dynamics are actually present in the audio signal. The determination of the dynamics is performed as follows. The sample values of the left and right audio channel are squared, added and the resulting signal is filtered through a low-pass filter. Advantageously, the low-pass filter has a limit frequency of about 3 Hz. Over a defined time period, advantageously, for example, five seconds, the minimum and the maximum of the audio signal are determined in this time frame. The actually present dynamic range in decibels then corresponds to ten times the difference of the logarithms of the two values.

In another advantageous embodiment of the invention, the dynamics of the left and right audio channel are calculated separately. During further consideration, only the audio channel with the larger dynamic range is used further.

There is also the possibility that, instead of squaring, an absolute value is formed and instead of low-pass filtering with subsequent search for a maximum, a level determination is carried out for short time durations, for example, over a period of a third of a second and then a maximum and minimum among these level values are used for the calculation of the dynamics.

In the case of film material there are large jumps in level and thus a greater dynamic range is present, since, for example, the signal level falls greatly during pauses in speech. However, music signals usually have a dynamic range of about 20 dB or less. A corresponding quantity can be obtained in a surprisingly simple manner by comparing the determined dynamic range with a threshold value.

If the dynamic range is greater than the threshold value then the quantity is set to the value −1 (film mode), otherwise to the value 1 (music mode). Instead of this rigid division, a sliding quantity will be determined below. For this purpose, the dynamic range is mapped through a function onto the value range [−1.0 . . . 1.0]. For this purpose, a simple function is to deduct the calculated dynamic range from the threshold value, to divide the result by the threshold value, and then limit this value to the value range [−1.0 . . . 1.0]. This value will be designated as M1 below. If the dynamic range should be 0, then M1 is calculated to be 1, in the case of a dynamic range corresponding to the threshold value, M1 is calculated to be 0, which is also to be evaluated as neutral, and in the case of dynamic ranges greater than or equal to twice the threshold value, M1 is calculated to be −1.0.

In order to avoid the response of this quantity in case of long signal pauses, a minimum level is assumed, which lies for example 30 dB below the maximum value which has occurred by a certain time span earlier, in an advantageous embodiment, approximately 5 minutes earlier. The maximum value found during the determination of the dynamics is used as comparison level. Should this value be below the minimum level, then the quantity M1 calculated from the dynamic range is set to −1.0. For a sliding cross-fading, the value range of 40 dB below the maximum level to 20 dB below the maximum level can be used. In the case of values more than 40 dB below the maximum level, M1 is set to −1, and in the case of values of less than 20 dB below the maximum level, it remains unchanged; at values in-between, a linear interpolation is performed correspondingly between these two limiting cases.

As another quantity, the periodicity of the audio signal is used, which will be designated below as M2. Many methods are known from the standard literature for the determination of the periodicity of an audio signal. A very simple method consists in squaring the sample values of the left and right channel, adding them and filtering the resulting signal through a low-pass filter with a limit frequency of about 50 Hz. The maxima are searched then in this signal. If it is found that the level maxima occur periodically at distances in time typical for music, which is between one third to a whole second, then this quantity, M2, is set to 1, otherwise it is set to −1.

Music signals can also be identified as such based on their spectral curves. Thus, for example, wind and string instruments have very characteristic spectra which can be detected easily. If such spectral curves are detected, then a quantity M3 is set to 1, otherwise it is set to 0. The value −1 is not used here, since the nonpresence of these spectra does not automatically mean that there is no music signal present. Thus, this quantity can also act in the direction of deciding that music is detected.

Unknown instruments can also be identified in the spectrum when several tones are played, that is, when simultaneously more than one tone can be detected. In this case, the spectrum typical for the instrument will be present multiply at different frequencies. Confusion with speech is not possible, since the spectra of different speakers are different, and one person can speak only at one tone level at any time. When such spectral constellations are detected, a quantity M4 is set to the value 1, otherwise, as indicated before for the quantity M3, it is set to the value of 0. An even more accurate conclusion is made possible by the fact that the frequencies of these tones can be compared. If we are dealing with music, then these are very probably in a musical relationship with one another, that is, they differ only by a factor which corresponds to the integer power of the twelfth root of 2. If such tones are detected, then music is detected even with the aid of recognition of melodies, that is, based on the observation of tone heights of this instrument as a function of time.

Since, in the case of music signals, usually several instruments are playing, which are tuned to each other by their frequency behavior, so that they mutually complement and not cover one another, in the case of music signals a relatively flat frequency curve is observed. The flatness of the frequency curve is also used as a measure for the presence of music. For this purpose, the level of the input signal, especially the sum of the right and left audio channels is determined in different frequency bands, especially in the frequency bands from 20 Hz to 200 Hz, from 200 Hz to 2 kHz and from 2 kHz to 20 kHz. The maximum level is determined for each of these, and this value is multiplied with the number of bands. Then the levels of the individual bands are subtracted from this. If a large value is obtained in this way, it indicates that the power is concentrated spectrally in few bands, and thus we are probably not dealing with music. In order to find this quantity, which is designated as M5 below, a value range from a maximum value to a minimum value is mapped linearly on the value range [−1.0 . . . 1.0]. Values outside this range are mapped on the limiting values.

A similar quantity can be derived from the number of spectral maxima with a certain minimum level. If many instruments are present, many such maxima are found. The number of maxima present can be mapped directly linearly onto the value range [−1.0 . . . 1.0] for the determination of another quantity, M6.

Apart from the analysis of the sound material, the source can also permit conclusions regarding the sound material. Thus, for example, when reproducing the transmission from a radio station or from a CD, the probability is very high that we are dealing with music signals. On the other hand, the reproduction of an AC3 coded DVD would rather be a film. Each source is thus assigned an individual quantity, thus, for example, the source CD is designated by the quantity 0.5 and a DVD with the value −0.3. This quantity is called M7.

A total quantity MG is determined from the individual quantities M1 to M7. For this purpose, all quantities M1 to M7 are weighted with an individual factor and added. Since M1 is of very great importance, it is weighted with the largest factor in comparison to the other quantities M2 to M7. In the further description of the invention, the quantity M1 is weighted with the factor 1, M2 with the factor 0.5, M3, M4, M5, M6 and M7 each only with a factor of 0.2. Values for the total quantity MG less than 0 then correspond to a signal without music, which should be then reproduced in the film mode, and values greater than 0 are classified as a music signal, for which then the music mode should be used. The more negative or more positive this value, the more unequivocal is the classification.

In order to avoid frequent switching in the limiting case, that is when the values of MG are near zero, a hysteresis is used. This means that switching from film mode to music mode will occur only when MG exceeds a value greater than 0 (for example, 0.3). Switching from music mode to film mode occurs only when the value goes below a number less than 0 −0.3).

The switching between film mode and music occurs wirh a delay and inertia that can be adjusted by the user. The signal type must be constant, corresponding to the delay time, otherwise the reproduction mode will not be changed. Then, after this delay time, a cross-fading occurs between the modes with a time constant that corresponds to the inertia, as a result of which otherwise audible signal jumps can be avoided, and the transition from one mode to the other made can achieved without being noticeable. In the normal case, this time constant is about 10 seconds. In the case of very short time constants, an attempt is made to make the change within a signal pause. In some cases, the delay time pre-selected by the user as well as the time constant of the inertia should be reduced further, for example, directly after the channel is switched in the case of a television set, and the audio signal of the television set is reproduced. This case can be detected simply when the corresponding audio processing is applied in the television set or if the television set sends a corresponding report to the other connected equipment. Such a switching process can also be recognized by an abruptly occurring signal pause, which, within an equipment, during switching processes, will have a duration typical for the equipment.

Furthermore, the detection of switching of channels is possible based on the image signal, since usually the synchronization is lost during switching. It can also be concluded that a channel was changed when the synchronization is lost. Upon detection of changing the channel, the delay time is then set to 0, and the time constant is reduced to a time of, for example, 3 seconds. After the first subsequent determination of the sound material, and a time period of corresponding length for cross-fading to the desired mode can then be changed again to the normal delay time and the long time constant can be changed.

The delay time and the inertia are also altered as a function of the absolute value of MG. Very high absolute values correspond to a very clear classification, and therefore in such cases earlier switching is possible.

Various sound programs can be used for the reproduction of music signals. For example, it is possible to output the difference signal between the left and right input signal onto the back loudspeaker, leaving the front channels uninfluenced. In addition, the difference signals can be preprocessed individually for both channels, and usually all-pass filters are used for this purpose. In this way, decorrelation of the back loudspeaker is achieved. Alternatively, in the case of music signals, a sound program can be used which is frequently called “echo”. In this program, in addition to the different signal, an echo portion of the original signal, as well as of the difference signal is emitted from all loudspeakers. It is common to all such sound programs suitable for music signals that the stereo width is largely retained, that is, no or only little signal is emitted from the front center loudspeaker, and also that no active matrixing occurs, so that the level for the front channels is not reduced when the difference signal of the input channels becomes greater in comparison to their sum.

For signals other than music, for example, the Dolby Pro Logic or a similar method is used. First of all, in this case, the level of the front channels is reduced when the difference signal of the input assumes a high level in comparison to the sum signal. If the difference signal is very small, then the signals of the front, right, and left channels are retracked to the front central channel in order to achieve a middle location of the speakers.

Instead of a 5-loudspeaker constellation, even more loudspeakers can be used so that then, for example, the difference signal is emitted from three back loudspeakers.

BRIEF DESCRIPTION OF THE DRAWING

The invention will be explained below with the aid of a specific practical example as illustrated in FIG. 1, which is a schematic view of an electronic circuit for carrying out the invention.

DETAILED DESCRIPTION

Figure 1:
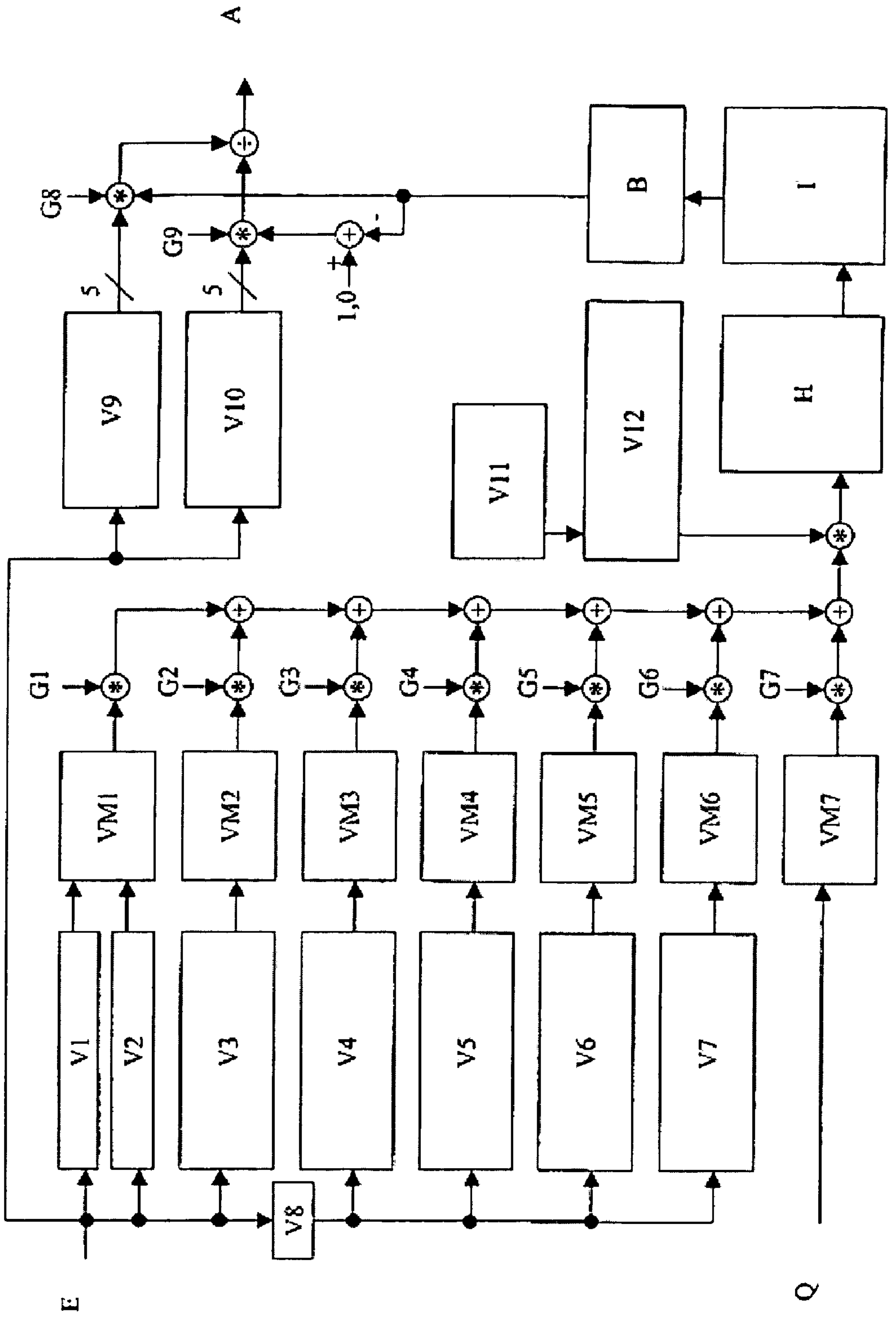

As seen in FIG. 1, the device V according to the invention has a signal input E, a source information input Q as well as a signal output A. Audio data are introduced to device V through input E. Especially, stereo audio data, that is, audio data in a two-channel method are introduced. If the data are introduced in analog form, then in a preconnected device, channel separation of the audio signal and digitization occurs. Then digital data are introduced to device V. However, the device V is extended so that it can also process multichannel audio data, for example in the AC3 format. Pure analog realization is also possible when the devices V8, V4, V5, V6 and V7 are realized through corresponding analog variants using filter banks instead of the FFT or if the evaluation of these characteristics is omitted.

The audio signals which are introduced to device V through input E are introduced at the same time to diverse other devices V1 to V10.

Devices V1 to V7 evaluate the input audio signal and also have another device VM1 to VM6 for mapping on a quantity. Here, the device VM1 serves for mapping on quantity 1, and the device VM2 for mapping on quantity 2, etc.

Furthermore, device V1 serves for determination of the dynamics, device V2 for determination of the level, device V3 for the determination of the periodicity, device V4 for determination of frequency spectra, especially of musical instruments, device V5 serves for the determination of the flatness of the frequency curve of the audio signal, device V6 for the determination of the number of maxima in the frequency spectrum, device V7 for the determination of the amount of similar spectral structures in the frequency spectrum, device V8 for the transformation of the audio signals from the time region into the frequency region, device V9 for processing of music signals, device V10 for processing other signals, device V11 for the detection of switching processes, and device V12 for mapping on a factor for controlling the switching speed.

The quantities obtained from devices VM1 to VM7 are weighted with weighting factors G1 to G7 and added. The total quantity obtained in this way is weighted again by devices V11 and V12 and passed through the hysteresis device H. The hysteresis device H prevents that switching from film mode to music mode and vice versa occurs only when the total quantity exceeds or goes below a predefined value. Then the total quantity is introduced to an integrator I, which advantageously limits to the region [−0.5 . . . 1.5] and to a device B for limiting to the region [0 . . . 1.0].

The total quantity, which is passed through integrator I and device B, weighted with and added to audio signals, which originate from devices V9 and V10. The corresponding audio processing mode is chosen in this way.

LIST OF REFERENCE SYMBOLS

A Output (5 channel)
B Device for limiting to region [0 . . . 1.0]
G1, G2, G3, G4, G5, G6, G7 weighting factors
H Hysteresis device
I Integrator
VM1 Device for mapping on quantity 1
VM2 Device for mapping on quantity 2
VM3 Device for mapping on quantity 3
VM4 Device for mapping on quantity 4
VM5 Device for mapping on quantity 5
VM6 Device for mapping on quantity 6
VM7 Device for mapping on quantity 7
V1 Device for the determination of the dynamics
V2 Device for level determination
V3 Device for periodicity determination
V4 Device for the determination of frequency spectra of musical instruments
V5 Device for the determination of the flatness of the frequency curve
V6 Device for the determination of the number of maxima in the frequency spectrum
V7 Device for the determination of the amount of similar spectral structures in the frequency spectrum
V8 Device for transformation in the frequency range
V9 Device for processing of music signals
V10 Device for processing of other signals
V11 Device for detection of switching processes
V12 Device for mapping on a factor for controlling the switching speed

The invention claimed is:

1. Method for the selection of a sound algorithm for the processing of an audio signal, wherein the audio signal is analyzed and, then, based on the analysis, the nature of the audio signal is determined, the audio signal is classified as a music signal or another signal and, depending on the classification, different sound algorithms are used for further processing and later reproduction of the audio signal and, for the classification of the audio signal, the method comprising:

determining a plurality of different individual quantities (M1 to M6) from at least one of the audio signal and the source of the audio signal (M7), weighting the determined quantities (M1 to M7 differently, and determining a total quantity (MG) for the audio signal by classifying the audio signal and by weighted addition of the individual quantities (M1 to M7), and introducing a hysteresis limit to the resulting quantity so as to avoid frequent switching at a switching threshold when the fluctuations from the switching threshold are small.

2. Method according to claim 1, wherein the audio signal is a stereophonic audio signal.

3. Method according to claim 1, wherein the audio signal consists of at least two audio channels.

4. Method according to claim 1, wherein in the case of a music signal, a sound program is chosen which contains the stereo range to the greatest possible extent or entirely.

5. Method according to claim 1, wherein in the case of a music signal, a sound program is chosen which does not produce any reduction of level or produces only a slight reduction of level of the front channels.

6. Method according to claim 1, wherein in the case of signals other than music, a sound program is chosen which operates similarly to the Dolby Pro Logic method.

7. Method according to claim 1, wherein depending on the classification of the audio signal, the parameters to be adjusted for music and film material are chosen automatically.

8. Method according claim 7, wherein switching of the front center channel to the front left and right channels is performed and that the degree of switching is carried out individually.

9. Method according to claim 1, wherein the dynamic range of the input signal and/or its level is used as first quantity (M1) for the classification of the audio signal.

10. Method according to claim 1, wherein the periodicity of the audio signal is used as second quantity (M2) for the classification of the audio signal.

11. Method according to claim 1, wherein the presence of typical signal spectra in music is used as a third quantity (M3) for the classification of the audio signal.

12. Method according to claim 11, wherein the typical signal spectra of wind instruments or string instruments are recognized.

13. Method according to claim 1, wherein the flatness of the frequency curve of the audio signal is used as a fourth quantity (M4) for the classification of the audio signal.

14. Method according to claim 1, wherein the number of maxima with a certain minimum level to be observed in the spectrum is used as a fifth quantity (M5) for the classification of the audio signal.

15. Method according to claim 1, wherein the presence of similar spectral structures at different frequencies in a spectrum is used as the sixth quantity (M6) for the classification of the audio signal.

16. Method according to claim 1, wherein the nature of the source of the audio signal is used as a seventh quantity (M7) for the classification of the audio signal.

17. Method according claim 16, wherein the source of the audio signal is a CD, a DVD, a data file, a radio signal receiver, an audio radio signal receiver, a satellite radio signal receiver, a cable radio signal receiver, a television transmission receiver.

18. Method according to claim 17, wherein the data file is an MP3 file.

19. Method according claim 1, wherein switching to another sound algorithm is performed only when the classification of the audio signal is constant for an adjustable time period.

20. Method according to claim 19, wherein the sound algorithms can be cross-faded into one another and that the time for cross-fading can be adjusted by the user.

21. Method according to claim 19, wherein the duration in which the classification of the audio signal is determined and the time for cross-fading of a sound algorithm into another sound algorithm is reduced as a function of the total quantity (MG) when the total quantity (MG) yields an unequivocal classification.

22. Method according to claim 19, wherein the switching processes of the source signals are recognized and in these cases the duration for the classification of the audio signal and the time for cross-fading of a sound algorithm into another sound algorithm are reduced.

23. Method according to claim 22, wherein the switching processes are recognized by an abruptly occurring signal pause.

24. Method according to claim 22, wherein the switching processes are recognized by a synchronization loss of an image signal.

* * * * *

UNITED STATES PATENT AND TRADEMARK OFFICE

CERTIFICATE OF CORRECTION

PATENT NO. : 7,206,414 B2
APPLICATION NO. : 10/491269
DATED : April 17, 2007
INVENTOR(S) : Donald Schulz It is certified that error appears in the above-identified patent and that said Letters Patent is hereby corrected as shown below:

Col. 1, Line 9, “modem” should be --modern--.

Col. 5, Line 36, “music occurs wirh” should be --music mode occurs with--.

Signed and Sealed this

Eighteenth Day of December, 2007

JON W. DUDAS
*Director of the United States Patent and Trademark Office*